US010139922B2

(12) United States Patent
Hsu

(10) Patent No.: US 10,139,922 B2
(45) Date of Patent: Nov. 27, 2018

(54) SPRING CONFIGURATION FOR TOUCH-SENSITIVE INPUT DEVICE

(71) Applicant: Microsoft Technology Licensing, LLC, Redmond, WA (US)

(72) Inventor: Feng-Hsiung Hsu, Cupertino, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 132 days.

(21) Appl. No.: 14/306,028

(22) Filed: Jun. 16, 2014

(65) Prior Publication Data

US 2015/0363006 A1    Dec. 17, 2015

(51) Int. Cl.
*G06F 3/02* (2006.01)
*H01H 13/26* (2006.01)
*G06F 3/0488* (2013.01)

(52) U.S. Cl.
CPC .......... *G06F 3/0219* (2013.01); *G06F 3/0202* (2013.01); *G06F 3/04886* (2013.01); *H01H 13/26* (2013.01)

(58) Field of Classification Search
CPC .. G06F 3/0219; G06F 3/0202; G06F 3/04886; H01H 13/26
See application file for complete search history.

(56) References Cited

U.S. PATENT DOCUMENTS

| 4,029,916 A | * | 6/1977 | Chu | ............... | H01H 13/7006 |
| | | | | | 200/275 |
| 5,667,319 A | * | 9/1997 | Satloff | ............... | G06F 3/0238 |
| | | | | | 341/22 |
| 5,973,621 A | * | 10/1999 | Levy | ............... | G06F 3/0202 |
| | | | | | 341/22 |
| 6,423,918 B1 | * | 7/2002 | King | ............... | H01H 13/48 |
| | | | | | 200/406 |

(Continued)

FOREIGN PATENT DOCUMENTS

| CN | 2155620 Y | 2/1994 |
| CN | 2932601 Y | 8/2007 |

(Continued)

OTHER PUBLICATIONS

Machine translation of JPH11306908 (A).*

(Continued)

*Primary Examiner* — Patrick Edouard
*Assistant Examiner* — Joseph Fox
(74) *Attorney, Agent, or Firm* — Merchant & Gould

(57) ABSTRACT

Disclosed are systems and methods associated with a touch-sensitive input device including a plurality of keys, wherein each key of the plurality of keys includes at least one spring. Such a spring may include a substantially planar peak located at a central portion of the spring, a first substantially arcuate leg extending from the peak in a first direction, and a second substantially arcuate leg extending from the peak in a second direction substantially perpendicular to the first direction. In one embodiment, a resistive force provided by (Continued)

the at least one spring decreases after the peak travels a first distance from an initial position of the peak. In such an embodiment, the first distance is less than or equal to approximately ⅕ of a range of travel of the peak.

24 Claims, 8 Drawing Sheets

(56) References Cited

U.S. PATENT DOCUMENTS

| | | | |
|---|---|---|---|
| 6,933,925 B1* | 8/2005 | Gibbons | G06F 3/03543 345/163 |
| 7,129,854 B2 | 10/2006 | Arneson et al. | |
| 7,557,320 B1* | 7/2009 | Crooijmans | H01H 13/85 200/406 |
| 8,592,699 B2 | 11/2013 | Kessler et al. | |
| 2001/0003326 A1* | 6/2001 | Okada | G01L 5/165 200/516 |
| 2009/0058819 A1* | 3/2009 | Gioscia | G06F 3/044 345/173 |
| 2009/0065342 A1* | 3/2009 | Yoon | H01H 13/88 200/5 A |
| 2009/0277766 A1* | 11/2009 | Fujitsuna | H01H 13/85 200/342 |
| 2010/0253633 A1* | 10/2010 | Nakayama | G06F 3/016 345/169 |
| 2011/0181402 A1* | 7/2011 | Goodrich | H01H 13/48 340/407.1 |
| 2011/0203912 A1* | 8/2011 | Niu | H01H 3/125 200/341 |
| 2011/0260976 A1* | 10/2011 | Larsen | G06F 3/04886 345/168 |
| 2012/0299832 A1 | 11/2012 | Peterson et al. | |
| 2013/0334018 A1 | 12/2013 | Hsu | |

FOREIGN PATENT DOCUMENTS

| | | |
|---|---|---|
| CN | 101192478 A | 6/2008 |
| CN | 201853592 U | 6/2011 |
| CN | 202454470 U | 9/2012 |
| CN | 103681056 | 3/2014 |
| EP | 1950782 | 7/2008 |
| JP | H11306908 | 11/1999 |
| JP | 2010218911 | 9/2010 |

OTHER PUBLICATIONS

PCT Search Report and Written Opinion for Application No. PCT/US2015/035220, dated Dec. 17, 2015, 15 pages.
The PCT Written Opinion of the International Preliminary Examining Authority dated May 20, 2016 for PCT application No. PCT/US2015/035220, 7 pages.
PCT International Preliminary Report on Patentability in International Application PCT/US2015/035220, dated Aug. 29, 2016, 9 pages.

* cited by examiner

SPRING CONFIGURATION FOR TOUCH-SENSITIVE INPUT DEVICE

BACKGROUND

Standard computing device keyboards typically include keys that are moveable against a mechanical spring disposed beneath each respective key. When optimized for ergonomics and other factors, such springs, and their corresponding keys, are characterized by a relatively long stroke and a moderate resistive force (i.e., "spring force"). As a result, keystrokes on such conventional keyboards have a distinct tactile response that has come to be preferred by users. In particular, the relatively long stroke of such keys may increase user confidence that a desired key has been successfully struck. Additionally, the resistive force provided by such springs may be tuned to maximize comfort and ease of use.

Recently, however, thin keyboard technologies have increased in popularity. Such thin keyboards are typically designed to mimic the functionality of standard keyboards while minimizing the overall weight and thickness of the device. For example, the keys of such thin keyboards may be designed to replicate the feel of conventional keyboard keys while having a reduced stroke to minimize keyboard thickness. To accomplish this, thin keyboards typically employ a dome-shaped spring beneath each respective key. However, it is difficult for current dome springs to accurately match the tactile response associated with the mechanical springs utilized in conventional keyboards. Moreover, it is difficult to change the resistive force provided by dome springs without modifying either the thickness of the material used to form such springs or the height of such springs. As a result, dome springs are not easily calibrated to provide a resistive force matching that of standard springs.

SUMMARY

This disclosure describes, in part, a touch-sensitive input device, such as a thin keyboard, touchpad, or other like peripheral. In some embodiments, such a device may include one or more keys configured to receive input from a user. Example keys of the present disclosure may each include one or more springs configured to provide a resistive force (i.e., "spring force") in response to application of and/or receipt of a corresponding key stroke force by a user of the touch-sensitive device. In example embodiments, the springs of the present disclosure may approximate the tactile feel of mechanical springs utilized in conventional keyboards while having a relatively shorter stroke. Additionally, the springs of the present disclosure may be shaped, sized, and/or otherwise configured to provide a resistive force matching that of corresponding mechanical springs. Further, the resistive force provided by the springs of the present disclosure may be easily tuned without altering either the thickness of the material used to form such springs or the height of such springs. In particular, the springs of the present disclosure may provide such a resistive force while being formed from materials having a reduced thickness relative to the materials used to form conventional dome springs. Additionally, the springs of the present disclosure may have a shorter range of travel than conventional dome springs. As a result, the springs of the present disclosure may approximate the tactile feel of conventional mechanical springs while having a relatively shorter stroke than the dome springs described above. Due to such configurations, the overall thickness of a keyboard utilizing the springs of the present disclosure can be reduced while improving the user experience. Additionally, manufacturing costs may be reduced and the difficulty associated with manufacturing such springs may be minimized.

In example embodiments, one or more springs of the touch-sensitive device may include a substantially planar peak located at a central portion of the spring. The peak may provide a surface for supporting, for example, a key cap or other like component of the device. Such springs may also include at least one leg extending from the peak. For example, such springs may include a first substantially arcuate leg extending from the peak in a first direction, and a second substantially arcuate leg extending from the peak in a second direction substantially perpendicular to the first direction. In further embodiments, such springs may include any number of additional legs useful in providing a desired resistive force associated with the corresponding key. For example, springs of the present disclosure may include a third substantially arcuate leg extending from the peak in a third direction substantially perpendicular to the second direction, and a fourth substantially arcuate leg extending from the peak in a fourth direction substantially perpendicular to the first and third directions.

In still further embodiments, such springs may also include any number of leg pairs. For example, the first and second legs described above may be a first pair of spring legs. In such embodiments, a spring may also include second, third, and/or fourth pairs of legs, and such pairs of legs may be disposed at any location relative to the peak of the spring. For example, the first pair of legs may be disposed at a first corner of the peak, the second pair of legs may be disposed at a second corner of the peak, the third pair of legs may be disposed at a third corner of the peak, and the fourth pair of legs may be disposed at a fourth corner of the peak.

In example embodiments, springs of the present disclosure may also be configured to provide any desired resistive force typically associated with conventional or thin keyboards. In some embodiments, the resistive force provided by such springs may decrease after the peak travels a first distance, from an initial position of the peak, less than or equal to approximately ⅓ of a range of travel of the peak. Further, the resistive force provided by the spring may increase as the peak travels, from the initial position, a distance less than or substantially equal to the first distance. Additionally, in some example embodiments such springs may be configured to provide a maximum resistive force between at least about 40 grams and at most about 60 grams, and such a maximum resistive force may be provided when the peak is located at a distance between at least about 0.2 mm and at most about 0.4 mm from the initial position. Such configurations may optimize the ergonomics and tactile response of the touch-sensitive device. It is understood that the above resistive forces and distances are examples. In further embodiments, springs of the present disclosure may be configured to provide a maximum resistive force greater than 60 grams. For example, such springs may be configured to provide a maximum resistive force that is greater than about 100 grams. Additionally, springs of the present disclosure may be characterized by a total range of travel that is at least about 0.5 mm. For example, such springs may be characterized by a total range of travel that is greater than about 2 mm.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Embodiments of the present disclosure are directed to, among other things, touch-sensitive input devices, such as keyboards associated with computing devices, and methods of manufacturing associated with such input devices. Embodiments described herein may be applied to keyboards, or similar human interface devices (HIDs), that may contain one or more keys or buttons, and such embodiments may improve typing efficiencies and user experience. Keyboards, as used herein, may be physical keyboards (i.e., made of a tangible material with a physical structure) integrated with, or used as a peripheral device to, computing devices. Physical keyboards may be of any structure with structure and thickness ranging from a sheet of paper to a keyboard with mechanically movable key-switch structures. For example, keyboards used with slate or tablet computers (e.g., the Touch Cover™ used with the Surface™ tablet manufactured by Microsoft® Corporation of Redmond, Wash.), notebooks or laptop computers, and the like, are contemplated for use with the embodiments of the present disclosure. However, it is to be appreciated that the disclosed embodiments may also be utilized with other similar types of HIDs (i.e., HIDs having multiple keys), pointing devices with keys or buttons, joysticks, remote control input devices for television or similar devices, gaming system controllers, mobile phone keyboards, automotive user input mechanisms, home automation keyboards (e.g., keyboards embedded in appliances, furniture, walls, etc.), and the like. The term "external keyboard" is sometimes used herein to denote any keyboard, including those listed above, that may be removably coupled to (via a wired or wireless connection) an associated computing device. Any keyboard that is "external" to an associated computing device in the sense that it is not an on-screen, soft keyboard that displays a keyboard GUI on an output display screen of a computing device, is contemplated for use with the embodiments disclosed herein, whether it be a physical or virtual keyboard.

The techniques and systems described herein may be implemented in a number of ways. Example implementations are provided below with reference to the following figures.

Example Architecture

Figure 1:
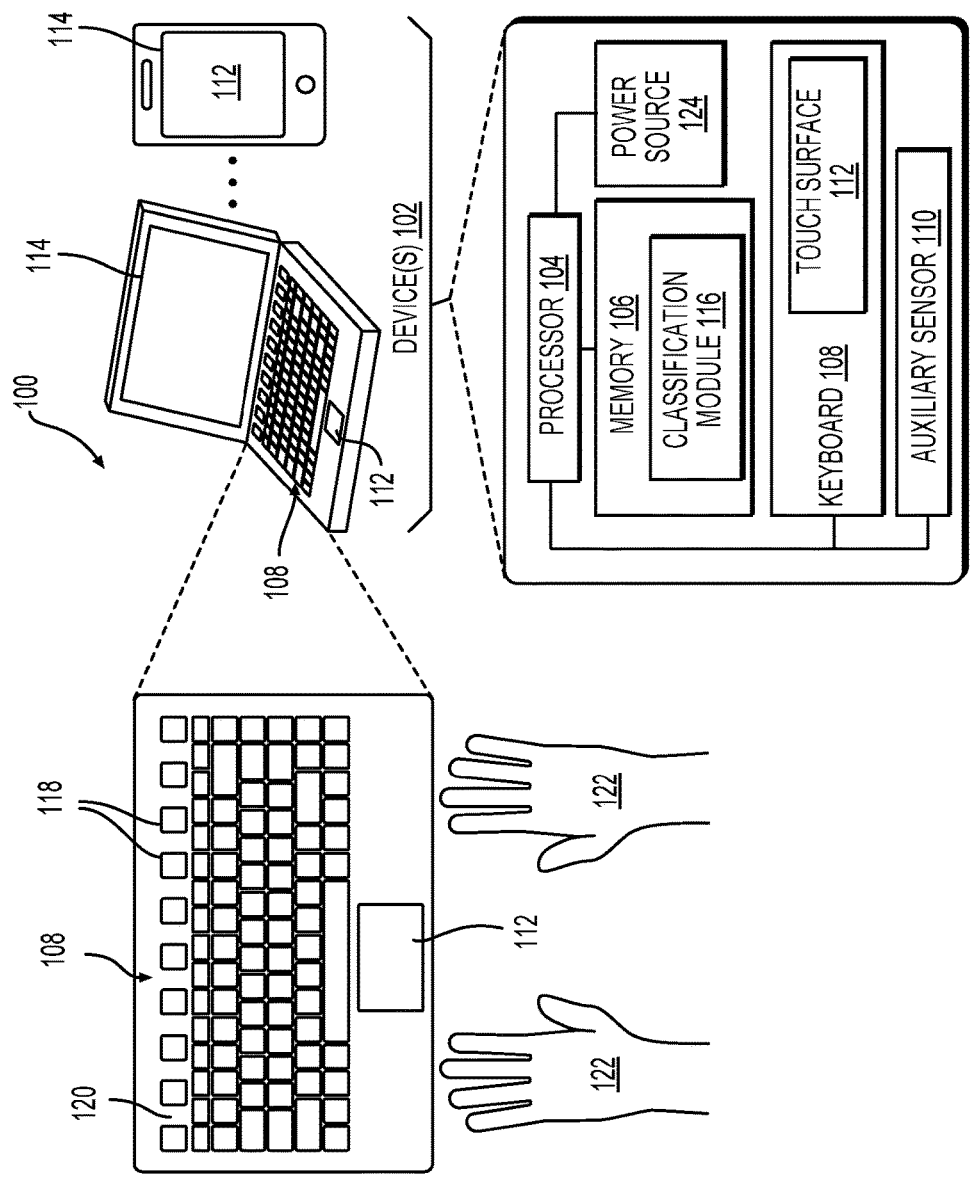
FIG. 1 illustrates an example architecture including a computing device having a touch-sensitive input device configured to receive user input.

FIG. 1 illustrates an example architecture 100 including a computing device 102 that is configured to receive information in the form of user input from one or more touch-sensitive input devices associated with the computing device 102. For example, the computing device 102 may be a tablet or notebook computer configured to accept information or other such inputs from a touch-sensitive keyboard, touchpad, touchscreen, or other like peripheral device. In some embodiments, the computing device 102 may be configured to perform an action in response to such input, such as outputting a desired letter, number, or symbol associated with a corresponding key of the touch-sensitive input device, selecting an interface element, moving a mouse pointer or cursor, scrolling on a page, and so on.

The computing device 102 may represent any machine or other device configured to process and/or otherwise carry out a set of instructions. In example embodiment, such a computing device 102 may comprise a stationary computing device or a mobile computing device. For example, a stationary computing device 102 may comprise, among other things, a desktop computer, a game console, a database, a server, a plurality of linked servers, and the like. Additionally, a mobile computing device 102 may comprise, among other things, a laptop computer, a smart phone, an electronic reader device, a mobile handset, a personal digital assistant (PDA), a portable navigation device, a portable gaming device, a tablet computer, a watch, a portable media player, and so on.

The device 102 may be equipped with one or more processor(s) 104, memory 106, keyboard(s) 108, auxiliary sensor(s) 110, touch surface(s) 112, and/or display(s) 114. In some embodiments, a touch surface 112 of the device 102 may provide a soft keyboard 108. Although not illustrated in FIG. 1, the device 102 may also include or be associated with one or more network interfaces, other input and/or output peripheral devices (e.g., a mouse, a non-integrated keyboard, a joystick, a microphone, a camera, a speaker, a printer, etc.), and/or other elements typically associated with a computing device. Some or all of the above components of the device 102, whether illustrated or not illustrated, may be in communication with each other and/or otherwise connected via one or more buses or other means. Such connections are illustrated schematically in FIG. 1. For example, it is understood that the example keyboard 108 shown in FIG. 2 may comprise a thin, tabletop keyboard that is physically separate from, but in communication with, the device 102.

The one or more processors 104 may include a central processing unit (CPU), a graphics processing unit (GPU), a microprocessor, and so on. Alternatively, or in addition, the processor 104 may include one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. The processor 104 may be operably connected to and/or otherwise in communication with the memory 106 and/or other components of the device 102 described herein. In some embodiments, the processor 104 may also include on-board memory configured to store information associated with various operations and/or functionality of the processor 104.

The memory 106 may include one or a combination of computer-readable media operably connected to the processor 104. Computer-readable media may include computer storage media and/or communication media. Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

The device 102 may communicate with one or more like devices, servers, service providers, or other like components via one or more networks (not shown). The one or more networks may include any one or combination of multiple different types of networks, such as cellular networks, wireless networks, Local Area Networks (LANs), Wide Area Networks (WANs), Personal Area Networks (PANs), and the Internet. Additionally, the service provider may provide one or more services to the device 102. The service provider may include one or more computing devices, such as one or more desktop computers, laptop computers, servers, and the like. In some embodiments, such service provider devices may include a keyboard or other like touch-sensitive input device employing one or more of the spring configurations described herein. The one or more computing devices may be configured in a cluster, data center, cloud computing environment, or a combination thereof. In one example, the one or more computing devices provide cloud computing resources, including computational resources, storage resources, and the like, that operate remotely to the device 102.

The memory 106 may include software functionality configured as one or more "modules." The term "module" is intended to represent example divisions of the software for purposes of discussion, and is not intended to represent any type of requirement or required method, manner or organization. Accordingly, various such modules, their functionality and/or similar functionality could be arranged differently (e.g., combined into a fewer number of modules, broken into a larger number of modules, etc.). Further, while certain functions and modules may be implemented by software and/or firmware executable by the processor 104, in other embodiments, one or more such modules may be implemented in whole or in part by other hardware components of the device 102 (e.g., as an ASIC, a specialized processing unit, etc.) to execute the described functions. In some instances, the functions and/or modules are implemented as part of an operating system. In other instances, the functions and/or modules are implemented as part of a device driver (e.g., a driver for a touch surface), firmware, and so on.

As illustrated in FIG. 1, the memory 106 may include a classification module 116. Although not shown in FIG. 1, in additional embodiments, the memory 106 may additionally or alternatively include a learning module and/or one or more additional modules. Although in the architecture 100 of FIG. 1 the classification module 116 is illustrated as being included in the device 102, alternatively, the classification module 116, a learning module, and/or other modules associated with the device 102 may be included in the service provider or network described above. As such, in some instances the device 102 may act as an input/output device that receives user input and outputs content, while the service provider performs functions for classifying user input, learning information, and other operations.

The classification module 116 may classify user input (e.g., key strokes, touch contacts, and/or other like, or input) received through the device 102 (e.g., via the keyboard 108 and/or the touch surface 112). The classification may be based on contextual information and/or other types of information. For example, the classification may be based on location information associated with a location on the keyboard 108 at which the contact occurs. In additional examples, the classification may be based on such location information and/or force information associated with the contact. For example, the classification may be based, at least in part, on a determined key stroke force applied to the keyboard 108 by the user in contacting the keyboard 108. Such classifications may be saved in the memory 106 and/or provided to the processor 104 by the classification module 116 for use in further operations of the device 102.

In some embodiments, a learning module (not shown) may learn information related to a user's interaction with the device 102. For example, a learning module may learn an average typing rate of the user (e.g., a number of key strokes per unit of time), characteristics about the user's hands (e.g., a size of the tips of the user's fingers, a palm size, etc.), how often after typing the user uses the touch surface 112, and so on. This information may be utilized to create a personalized user experience and/or profile for the touch surface 112 and/or other input devices. Such personalized user experiences and/or profiles may be saved in the memory 106 and/or provided to the processor 104 for use in further operations of the device 102.

In some embodiments, the keyboard 108 may include a set of mechanical or pressure-sensitive buttons, while in other instances the keyboard 108 may be implemented through a touch screen or other type of touch surfaces 112 described herein. The buttons of the keyboard 108 may include alphanumerical keys (e.g., letters or numbers), control keys (e.g., shift, enter, F1-F12, esc, etc.), or any other type of key 118. Such keys 118 may be disposed on, embedded substantially within, and/or formed by an outer surface 120 of the keyboard 108. The keyboard 108 of FIG. 1 illustrates one example layout, but it is to be appreciated that the embodiments described herein are not limited to any particular keyboard layout such that keyboards with any number of keys 118 in any arrangement or layout may be utilized without changing the basic characteristics of the device 102. The keys 118 may comprise physical actuating keys, and each key 118 may be appropriately labeled to identify a particular key 118 with one or more characters, such as letters, numbers, symbols, etc. The keys 118 may generally register a specific character, symbol, or function upon activation of the keys 118 by a keyboard user. For example, such keys 118 may be actuated in response to a user's finger and/or other portions of a user's hand 122 contacting one or more of the keys 118 and/or the touch surface 112.

The auxiliary sensor 110 may represent a proximity sensor that detects a proximity of objects to the device 102 (e.g., a sensor that detects a user gripping the device 102, etc.), a presence sensor, an infrared (IR)/thermal sensor, a Wi-Fi® sensor, a camera, a microphone, and so on. In some instances, the camera and/or microphone may act to detect proximity of an object to the device 102 (e.g., by analyzing video or audio of objects that are in proximity to the device). Although many of the example techniques herein discuss user input as corresponding to a touch contact, the techniques may similarly apply to other types of user input, such as air input. As used herein, "air input" may refer to any type of input that is received without contacting the outer surface 120 (e.g., through the air). In one instance, air input comprises an air gesture, such as a user waving a hand to initiate an action, a user holding a hand in a particular orientation or manner (e.g., making a first or thumbs-up), or any other type of bodily action or positioning. As such, in some instances the auxiliary sensor 110 of the device 102 may include cameras, temperature sensors, proximity sensors, IR sensors, microphones, or other devices to detect air input.

The touch surface 112 may comprise any type of digitizer configured to detect a touch contact. The detection may be based on capacitive, optical, or any other sensing technique. In one example, the touch surface 112 includes a touch pad (also known as a track pad) having a tactile sensor to sense touch, pressure, and/or force (of an area of contact). Alternatively, or additionally, the touch surface 112 may include a touch screen. In some instances, the touch surface 112 may be implemented as a device that includes a touch pad and a mouse (e.g., a combination touch pad-mouse device external to or integrated with the device 102). Further, in some instances the touch surface 112 may be implemented as a touch screen display configured to display content, while the touch pad may not be configured to display content.

The device 102 may be operably connected to a power source 124. In some embodiments, the power source 124 may comprise a rechargeable battery removably connected to the device 102. In such embodiments, the power source 124 may be disposed substantially within a portion of the device 102, and may be removed or replaced as needed. Alternatively, the power source 124 may comprise a wall outlet or other like source of external DC power connectable to the device 102. The power source 124 may be operably connected to the processor 104, the keyboard 108, the auxiliary sensor 110, and/or other components of the device 102, and may be configured to provide electrical power to such components during operation of the device 102. The device 102 and/or the power source 124 may include one or more drivers, transformers, power circuits, converters, regulators, and/or other like components (not shown) configured to condition the electrical power provided by the power source 124 as necessary.

Example Device

Figure 2:
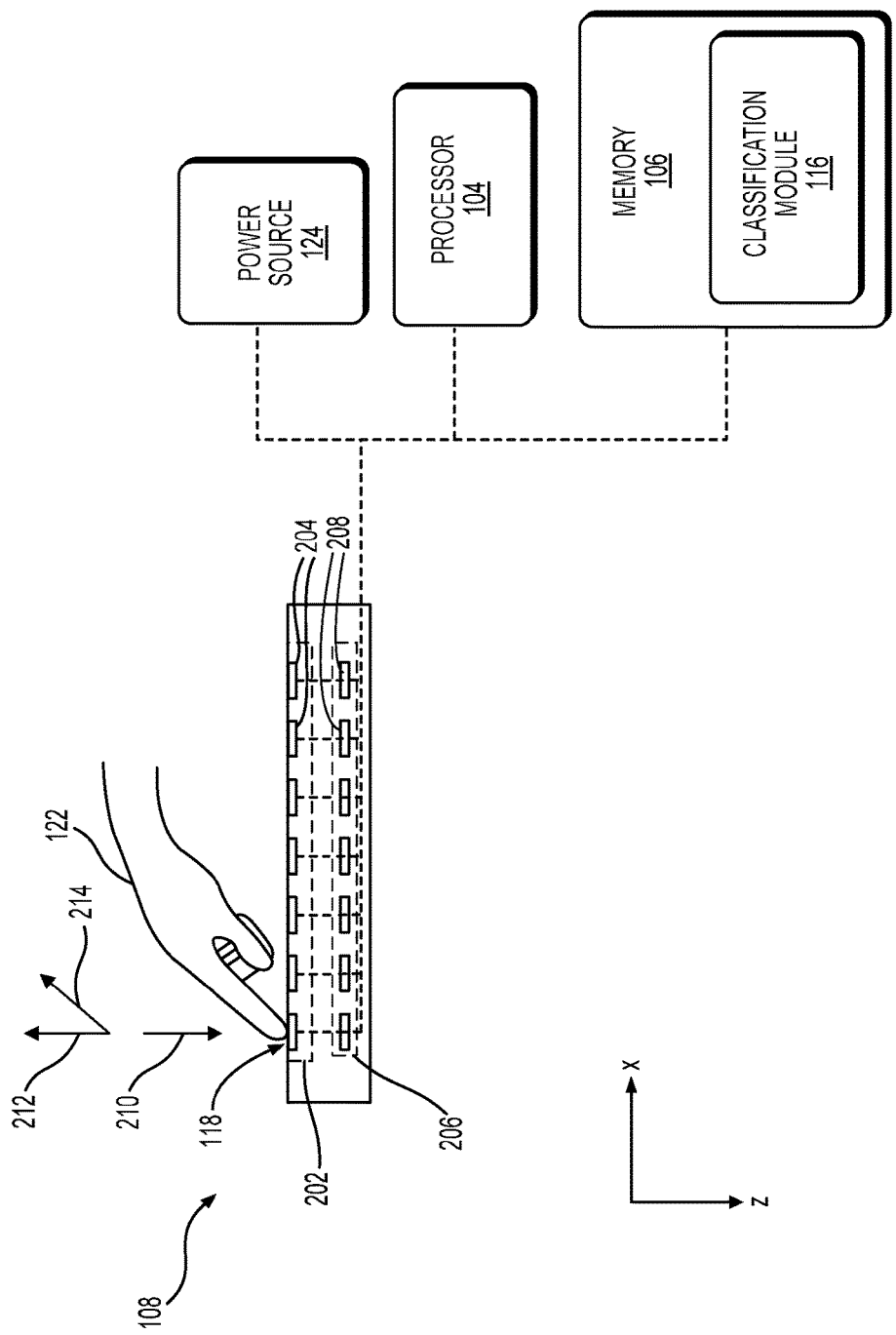
FIG. 2 illustrates an example of a structure of a computing device having a touch-sensitive input device.

FIG. 2 illustrates example structural details of the device 102 of FIG. 1. In particular, FIG. 2 illustrates a partial cross-sectional view of a keyboard 108 associated with the device 102. As noted above, the keyboard 108 is one example of a touch-sensitive input device including a plurality of keys 118. The keyboard 108 may be either embedded within the computing device 102, or removably coupled to the computing device 102 as with an external keyboard. For example, the keyboard 108 may be physically connected to the computing device 102 through electrical couplings such as wires, pins, connectors, etc., or the keyboard 108 may be wirelessly coupled to the computing device, such as via short-wave radio frequency (e.g., Bluetooth®), or another suitable wireless communication protocol.

As shown in FIG. 2, the keyboard 108 may include a plurality of components configured to receive key strokes or other like input from, for example, the hand 122 of a user. Such components may be configured to determine a force, location, and/or other characteristics associated with such input. Additionally, such components may be configured to provide a resistive force in response to receiving such user input. The resistive force provided by such components may be tuned to approximate the resistive force provided by mechanical springs of conventional keyboards. Additionally, such components may be tuned to approximate the relatively long stroke of such mechanical springs. The components of the keyboard 108 may be operably connected to and/or otherwise in communication with, for example, the processor 104, the memory 106, the power source 124, and/or other components of the device 102, and the various components of the keyboard 108 may be configured to provide information in the form of electrical signals to such components of the computing device 102 for processing.

As shown in FIG. 2, the keyboard 108 may include a sheet of material 202 forming a plurality of springs 204, a substantially planar substrate 206 supporting at least a portion of the sheet of material 202, and one or more sensors 208 configured to determine a position, proximity, velocity, acceleration, and/or other characteristic of at least a component of a respective spring 204. In some embodiments, one or more of the above components may be mounted to, embedded within, and/or otherwise substantially contained within an outer housing (not shown) of the keyboard 108 and/or other like touch input device. Alternatively, the substrate 206 may comprise at least an outer bottom surface of the keyboard 108 and/or other touch input device.

In some embodiments, the substrate 206 may comprise a support layer of the keyboard 108 configured to provide a requisite level of rigidity and strength to the keyboard 108, and its components. For example, the substrate 206 may comprise a substantially planar board, film, plate, or other like structure. The substrate 206 may have any shape, size, dimension, and/or other configuration suitable for supporting keyboard components. For example, in some embodiments the substrate 206 may have a substantially rectangular and/or substantially square shape typically associated with the keyboard 108. Additionally, such a substrate 206 may be as thin as possible so as to minimize the overall thickness of such keyboards 108. In example embodiments, the thickness of the substrate 206 (i.e., in the Z direction) may be between at least about 1 mm and at most about 3 mm, and in further embodiments, the thickness of the substrate 206 may be less than approximately 1 mm. Additionally, the substrate 206 may be made from any metal, alloy, polymer, plastic, or other like material.

In some embodiments, the substrate 206 and/or other components of the keyboard 108 may comprise a printed circuit board. In such embodiments, the printed circuit board may be made from any substantially flexible material, such as Kapton®, or other circuit board materials configured for use in touch-sensitive input devices. In such embodiments, a printed electrical circuit, and associated electrical components, may be formed on, connected to, in communication with, and/or embedded substantially within the printed circuit board. The printed circuit board and each of its components may be electrically and/or otherwise operably connected to the processor 104 and/or any of the other components of the computing device 102 described herein. Additionally, in such embodiments the printed circuit board may function as a platform or support structure for one or more of the keyboard components described herein. For example, such components may be disposed on, embedded substantially within, and/or otherwise fixed to a first side of the printed circuit board facing the sheet of material 202. The printed circuit board may also include a second side opposite the first side and facing away from the sheet of material 202. In such an embodiment, the first side of the printed circuit board may face an interior of the keyboard 108, and the second side of the printed circuit board may face and/or may form an exterior of the keyboard 108.

In some embodiments, the sheet of material 202 may be similar to the substrate 206 described above. For example, the sheet of material 202 may have a shape, size, thickness, and/or other configuration that substantially matches a corresponding configuration of the substrate 206. Like the substrate 206, the sheet of material 202 may have a substantially rectangular and/or substantially square shape common to keyboards 108. Additionally, the thickness of the sheet of material 202 may be minimized in order to minimize the overall thickness of the resulting keyboard 108. In example embodiments, the sheet of material 202 may have a thickness (i.e., in the Z direction) between at least about 0.1 mm and at most about 0.5 mm. In further embodiments, the sheet of material 202 may have a thickness equal to approximately 0.1 mm or less. Further, the sheet of material 202 may be made from any of the materials described above with respect to the substrate 206, and in some embodiments, the sheet of material 202, and the springs 204 included thereon, may be formed through any of a number of manufacturing processes. For example, the sheet of material 202 and the springs 204 may be formed through one or more of cutting, etching, thermoforming, molding, and/or any other suitable manufacturing process. Further, in some embodiments the sheet of material 202 and/or the springs 204 may be made from a substantially transparent material such that one or more of the sensors 208 may be utilized to determine, for example, a location and/or position of the spring 204 and/or a component of the spring 204.

The sensors 208 may comprise any of the sensors described above with respect to the auxiliary sensors 110. In example embodiments, one or more of the sensors 208 may comprise an optical sensor, light sensors, proximity sensor, capacitance sensor, pressure sensor, accelerometer, gyroscope, or other like sensor configured to determine one or more characteristics of an object disposed within a field of view of the sensor. As shown in FIG. 2, at least one sensor 208 may be positioned and/or otherwise configured so as to correspond to a respective key 118 of the keyboard 108. In such embodiments, the at least one sensor 208 may determine the location, force, velocity, acceleration, and/or other characteristics associated with the respective key 118 and/or with one or more springs 204 of the respective key 118. Each of the sensors 208 may be electrically, operably, and/or otherwise connected to the printed circuit board described above. Additionally, and/or alternatively, each of the sensors 208 may be electrically, operably, and/or otherwise connected to the processor 104 and/or any of the other components of the computing device 102 described herein. Accordingly, the sensors 208 may be configured to provide one or more signals to such components of the computing device 102 containing information indicative of the one or more characteristics sensed, monitored, calculated, and/or otherwise determined by the sensors 208. In some embodiments, one or more sensors 208 may be disposed on and/or embedded at least partially within the substrate 206, the sheet of material 202, one or more of the springs 204, the printed circuit board described above, and/or any other components of the keyboard 108. Alternatively, one or more of the sensors 208 may be spaced from such components and/or otherwise mounted substantially within the keyboard 108 to assist in determining one or more of the characteristics described above.

As noted above, each key 118 of the keyboard 108 may include at least one of the springs 204 formed by the sheet material 202. Each of the springs 204 may be operative to provide a resistive force (i.e., a spring force) in response to the application of a key stroke force and/or other like input from the user. For example, one or more fingers of the user's hand 122 may apply a key stroke force to a particular key 118 in the direction of arrow 210. In response, a spring 204 corresponding to the particular key 118 may provide a resistive force substantially in the direction of arrow 212. As will described in greater detail below, the resistive force provided by such springs 204 may vary (i.e., may be dynamic) as the spring 204 is acted upon by the user. For example, such a resistive force may increase when a key stroke force is initially applied to the spring 204, but may then decrease as the applied key stroke force causes further movement of the spring.

Moreover, such springs 204 may also be configured to provide a resistive force in response to the application of a key stroke force at an off-center location on the key 118 and/or on the spring 204. As will be described in greater detail below, such a resistive force may comprise a corrective torque that is provided by the spring 204. In one example, such a key stroke force may be applied to the side or edge of one of the keys 118 by the user, and may be the result of the user not accurately striking the key 118. In such an embodiment, the corrective torque may be provided by the spring 204 of the key 118 in the direction of arrow 214. It is understood that the direction of arrow 214 shown in FIG. 2 is merely exemplary, and that in additional embodiments, such a corrective torque may be provided by the spring 204 in any direction that is substantially opposite from the corresponding key stroke force provided by the user.

The springs 204 may have any of a variety of different configurations, and several example spring configurations are illustrated in at least FIGS. 3-6. While FIGS. 3-6 illustrate various example configurations of springs 204 that may be utilized with the keyboards 108 described herein, it is understood that one or more additional spring configurations may also be utilized depending on, for example, the desired resistive force, stroke (i.e., range of travel), tactile feel, ergonomics, and/or other resulting characteristics of the respective keys 118 and/or of the keyboard 108, generally. In particular, the length, width, height, shape, radius, thickness, stiffness, relative proximity, and/or other configurations of each spring 204 described herein may be altered in any way in order to achieve a corresponding resistive force, range of travel, tactile feel, and/or other characteristic of a respective key 118.

Figure 3:
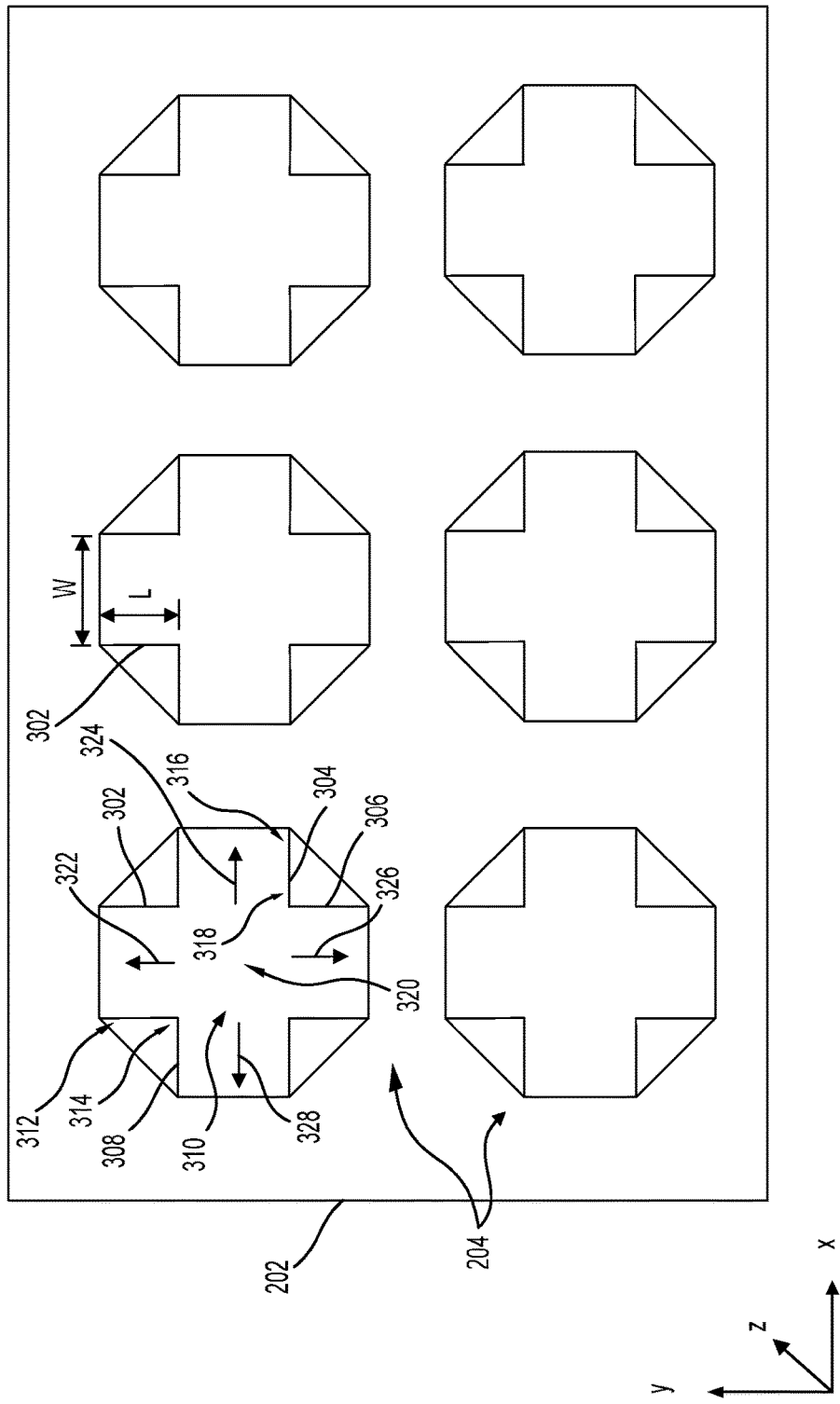
FIG. 3 illustrates springs of a touch-sensitive input device according to a first example embodiment.

As shown in FIG. 3, a plurality of springs 204 may be formed from the single sheet of material 202 described above. Each of the springs 204 may include, among other things, at least one leg, and a first end of the leg may be connected to the sheet of material 202 while a second end of the leg opposite the first end may be connected to a substantially planar peak of the spring 204. For example, each spring 204 may include a first leg 302, a second leg 304, a third leg 306, and a fourth leg 308. While each of the springs 204 shown in FIG. 3 include four legs 302, 304, 306, 308, in additional embodiments, such springs 204 may include any number of legs less than or greater than four.

As shown in FIG. 3, each of the legs 302, 304, 306, 308 may extend from a substantially planar peak 310 of the spring 204. For example, a first end 312 of the first leg 302 may be connected to the sheet of material 202 while a second end 314 of the first leg 302 may be connected to peak 310. Similarly, a first end 316 of the second leg 304 may be connected to the sheet of material 202 while a second end 318 of the second leg 304 may be connected to the peak 310. In this way, the peak 310 may be located at a central portion 320 of the spring 204, and the legs 302, 304, 306, 308 may extend from the peak 310 in any conventional manner and/or direction so as to mate with the substantially planar sheet of material 202. Moreover, as noted above one or more of the springs 204 may be configured to provide a corrective torque in response to application of a key stroke force to an off-center location on the spring 204. In such embodiments, an example off-center location may be disposed between the peak 310 and an end 312, 316 of at least one of the first and second legs 302, 304. It is understood that in still further embodiments (not shown), an example spring 204 may include a leg extending substantially along and/or beneath each side of the peak 310. In embodiments in which the peak 310 has a substantially square shape, such a spring 204 may include a respective arcuate leg extending along and/or beneath each of the four sides of the peak 310. Such legs may extend from the peak 310 to the sheet of material 202 as described above. Further, in additional embodiments one or more keys 118 of the keyboard 108 may include multiple springs 204 of the present disclosure. For example, a key 118 may include a respective spring 204 disposed beneath, associated with, and/or connected to various edges of a keycap of the key 118. In embodiments in which the keycap is square or rectangular in shape, such a key 118 may include a total of four springs 204, each of which may be disposed beneath, associated with, and/or connected to a respective edge of the keycap. Such edges may be formed by and/or otherwise disposed at the perimeter of the keycap. In such an embodiment, one or more of the four springs 204 may comprise a single pair of legs 302, 306, and thus, may comprise a "single-arc" spring 204. In further embodiments in which such a keycap has a different shape or configuration, such as a triangular shape, a pentagonal shape, a hexagonal shape, or the like, more or less than four springs 204 may be employed. Additionally, in such embodiments, one or more guiding structures or other components of the keys 118 described herein may be omitted.

As will be described in greater detail below with respect to at least FIG. 6, the legs 302, 304, 306, 308 of the spring 204 may elevate the peak 310 of the spring 204 to any desirable height relative to the remainder of the substantially planar sheet of material 202. As noted above, however, this height may be minimized so as to minimize the overall thickness of the keyboard 108. It is understood that at least one sensor 208 may be in communication with each key 118 of the keyboard 108, as well as with the processor 104 of the device 102. Additionally, the sensor 208 may be configured to determine a position of the peak 310 along a range of travel of the peak, a velocity, acceleration, proximity, distance traveled, and/or other measurable characteristic of the peak 310.

Additionally, it is understood that one or more of the legs 302, 304, 306, 308 may extend from the peak 310 in any conventional direction. For example, the first leg 302 may extend from the peak 310 in a first direction 322, and the second leg 304 may extend from the peak 310 in a second direction 324 that is substantially perpendicular to the first direction 322. Moreover, the third leg 306 may extend from the peak 310 in a third direction 326 that is substantially perpendicular to the second direction 324, and the fourth leg 308 may extend from the peak 310 in a fourth direction 328 that is substantially perpendicular to the first direction 322 and the third direction 326. The first, second, third, and fourth directions illustrated by arrows 322, 324, 326, 328 are merely exemplary, and in further embodiments, one or more of the legs 302, 304, 306, 308 may extend radially from the peak 310 in an alternative direction and/or at an alternative angle.

The legs 302, 304, 306, 308 and/or the peak 310 of each spring 204 may be cut, etched, thermoformed, molded, and/or otherwise formed from the sheet of material 202 to have any shape, size, length, width, height, thickness, and/or other configuration useful in "tuning" the resistive force, corrective torque, range of travel, overall height, stiffness, and/or other characteristics of the resulting spring 204 or its components. For example, as shown in the top view of FIG. 3, each of the legs 302, 304, 306, 308 may have a substantially uniform width W, length L, and/or other like dimension. Additionally, the thickness of each leg may be determined by, for example, the thickness of the sheet of material 202 and/or by one or more stretching, thermoforming, molding, or other like leg formation processes. In further embodiments, one or more of the legs 302, 304, 306, 308 may be tapered, curved, angled, and/or bowed along the length L and/or along the width W thereof in order to tune and/or otherwise achieve one or more of the above characteristics of the resulting spring 204. In example embodiments of the present disclosure, the length L may be described as a "span" of a respective leg of a spring 204. Such a length L may be between at least about 1 mm and at most about 4 mm or greater. For example, in some embodiments such a length L may be any dimension between about 1 mm and about 3 mm.

Additionally, it is understood that the springs 204 may have any height and/or side profile useful in tuning and/or otherwise achieving one or more of the above characteristics of the resulting spring 204. Such a height H1 is illustrated in the partial cross-sectional view of FIG. 6. In example embodiments of the present disclosure, the height H1 of a spring 204 may be between at least about 0.1 mm and at most about 2 mm or greater. For example, in some embodiments such a height H1 may be any dimension between about 0.4 mm and about 0.8 mm. As shown in at least FIG. 6, one or more legs of the springs 204 may have a substantially arcuate shape and/or profile. In such embodiments, one or more of the legs of the springs 204 may have an arc radius between at least about 1 mm and at most about 8 mm. For example, in some embodiments such an example arc radius may be any dimension between about 2 mm and about 5 mm. While the profile of the legs 302, 304 shown in FIG. 6 is substantially concave, in further embodiments, the profile of one or more legs 302, 304, 306, 308 of each spring 204 may be substantially convex, substantially linear, substantially undulating, substantially ribbed, substantially notched, substantially stepped, or the like. Each of the above configurations may be useful in tuning and/or otherwise achieving one or more of the above characteristics of the resulting spring 204. It is understood that the springs 204 of the present disclosure may be "tuned" by modifying one or more of the lengths L, widths W, heights H1, shapes, profiles, quantities, locations, and/or other characteristics of the legs, peak 310, or other portions of each spring 204. For example, such tuning may include, among other things, increasing the width W and/or reducing the length L of one or more legs of the spring 204 to increase the resistive force provided by the spring 204. Such tuning may also include, among other things, decreasing the width W and/or increasing the length L of one or more legs of the spring 204 to decrease the resistive force provided by the spring 204. It is understood that the above dimensions associated with the length L, height H1, arc radius, and other configurations of the spring 204 are merely exemplary, and that such dimensions may be greater than or less than those described herein.

Figure 4:
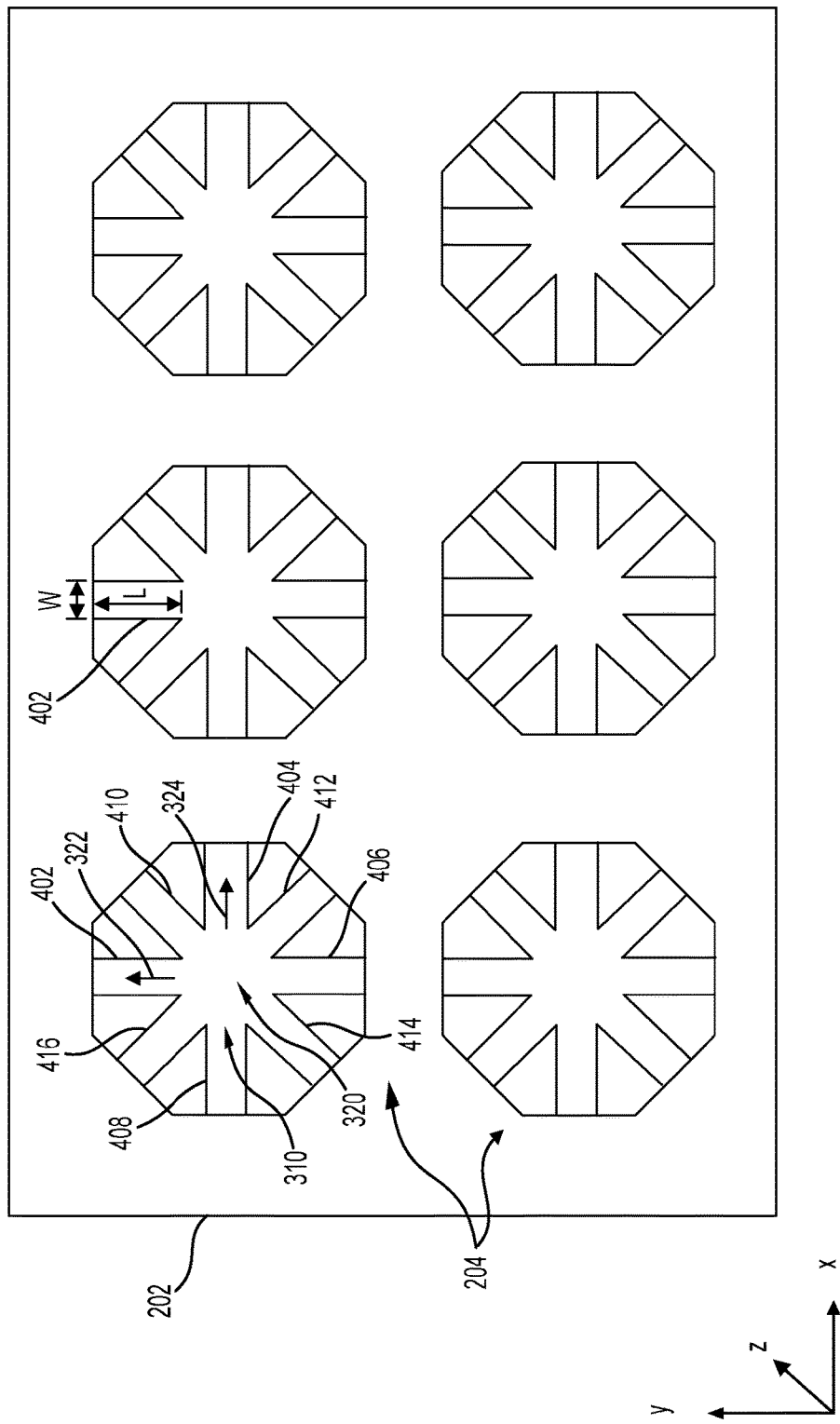
FIG. 4 illustrates springs of a touch-sensitive input device according to a second example embodiment.

As shown in FIG. 4, in another example embodiment, one or more springs 204 of the present disclosure may include more than four legs. For example, one or more springs 204 formed from the sheet of material 202 may include a first leg 402, a second leg 404, a third leg 406, and fourth leg 408 that are oriented in a manner similar to that described above with respect to the first, second, third, and fourth legs 302, 304, 306, 308 shown in FIG. 3. In addition, such springs 204 may include fifth, sixth, seventh, and eighth legs 410, 412, 414, 416, and/or any number of additional legs as desired. To account for this number of legs, the length L, width W, height H1, and/or any other dimensions or configurations may be modified in order to achieve one or more of the above characteristics of the resulting spring 204. For example, by comparing the springs 204 shown in FIGS. 3 and 4, it can be seen that the width W of one or more of the legs shown in FIG. 4 may be relatively less than the corresponding width W of the legs shown in FIG. 3. Further, the length L of one or more of the legs shown in FIG. 4 may be increased or decreased relative to the corresponding length L of the legs shown in FIG. 3. It is understood that one or more of the legs 402, 404, 406, 408, 410, 412, 414, 416 shown in FIG. 4 may have the arcuate profile and/or any other profile described above with respect to FIG. 6. Further, the configurations of the legs 402, 404, 406, 408, 410, 412, 414, 416 shown in FIG. 4 may be useful in tuning and/or otherwise achieving one or more desired characteristics of the resulting spring 204. It is understood that, for ease of description, like item numbers have been used throughout this disclosure to identify like components. For example, FIG. 4 illustrates a spring 204 having a substantially planar peak 310 and a central portion 320 similar to corresponding components described above with respect to FIG. 3. FIG. 4 also illustrates arrows 322, 324 indicative of first and second directions, respectively, that are similar to corresponding arrows 322, 324 shown in FIG. 3.

Figure 5:
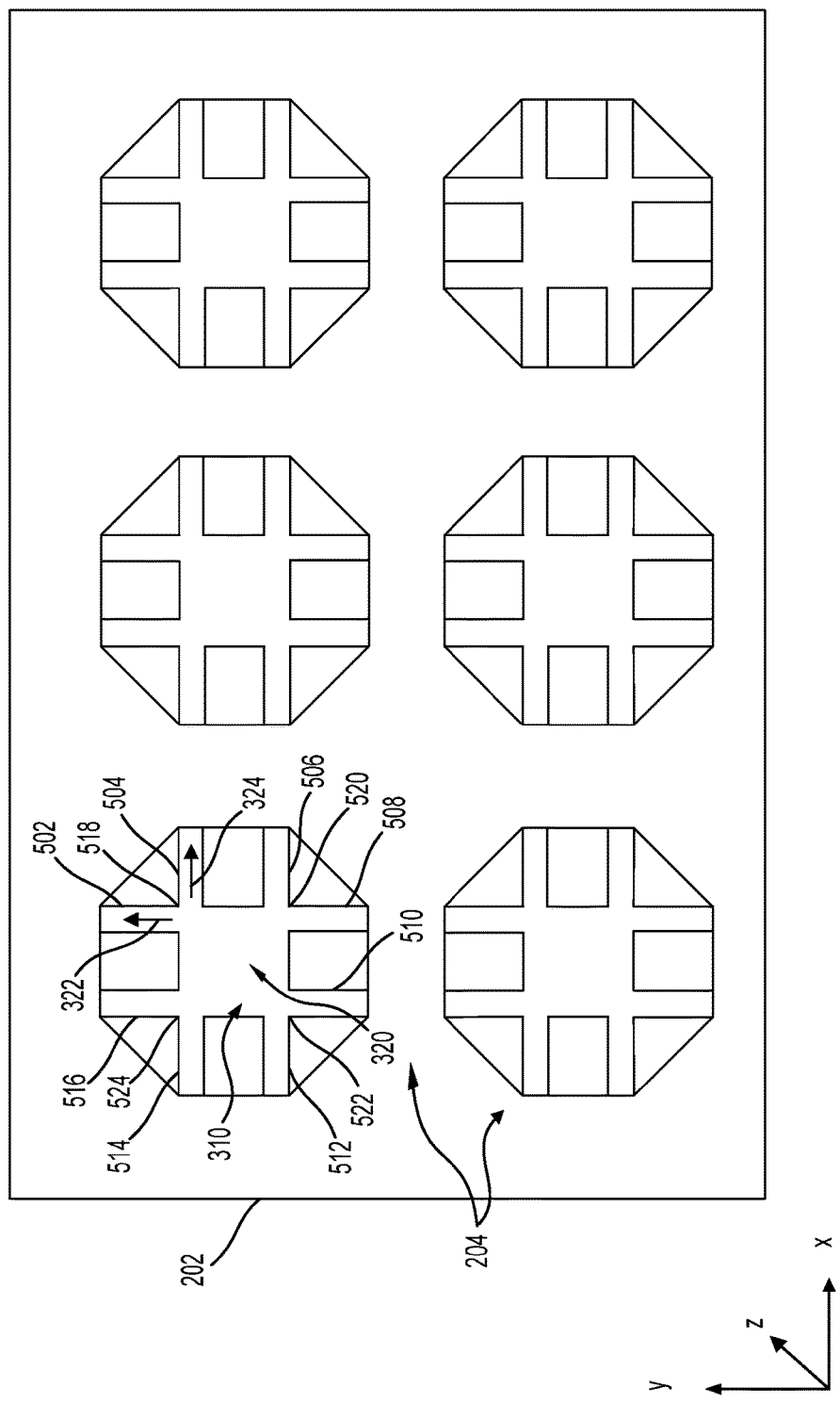
FIG. 5 illustrates springs of a touch-sensitive input device according to a third example embodiment.

As shown in FIG. 5, in still another example embodiment, one or more springs 204 of the present disclosure may include one or more pairs of legs. For example, one or more springs 204 formed from the sheet of material 202 may include a first pair of legs 502, 504, a second pair of legs 506, 508, a third pair of legs 510, 512, and a fourth pair of legs 514, 516. It is understood that one or more of the legs 502, 504, 506, 508, 510, 512, 514, 516 may have any of the configurations and/or orientations described above with respect to the legs shown in FIGS. 3, 4, and/or 6. For example, one or more of the legs 502, 504, 506, 508, 510, 512, 514, 516 may have a length L, width W, height H1, profile, and/or other configuration substantially similar to one or more of the legs described above with respect to FIGS. 3, 4, and/or 6. Additionally, each pair of legs shown in FIG. 5 may be located proximate and/or otherwise disposed at a respective corner of the peak 310. For example, the first pair of legs 502, 504 may be disposed at a first corner 518 of the peak 310, the second pair of legs 506, 508 may be disposed at a second corner 520 of the peak 310, the third pair of legs 510, 512 may be disposed at a third corner 522 of the peak 310, and the fourth pair of legs 514, 516 may be disposed at a fourth corner 524 of the peak 310. Further, the configurations of the legs 502-516 shown in FIG. 5 may be useful in tuning and/or otherwise achieving one or more desired characteristics of the resulting spring 204.

Figure 6:
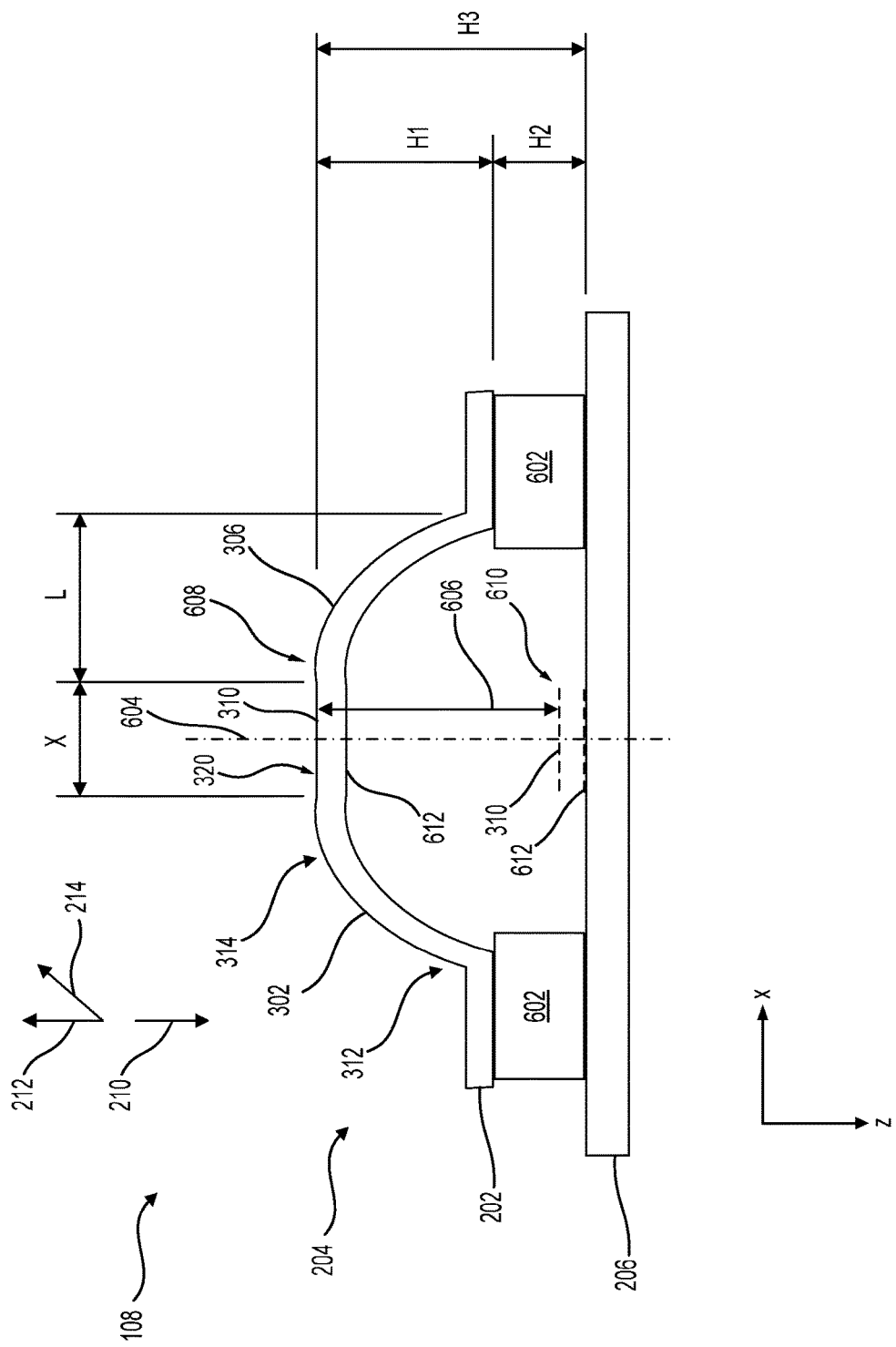
FIG. 6 illustrates a partial cross-sectional view of an example touch-sensitive input device.

FIG. 6 illustrates a partial cross-sectional view of an example keyboard 108, with portions removed for clarity. In particular, FIG. 6 illustrates a partial cross-sectional view of a keyboard 108 including an example spring 204 as described above with respect to FIG. 3. For ease of description, the components shown in FIG. 6 have been identified with item numbers corresponding to the item numbers employed in FIG. 3 in order to identify like components shown in these two figures. For example, FIG. 6 illustrates a sheet of material 202, a spring, a substrate 206, a first leg 302, a third leg 306, a substantially planar peak 310, first and second ends 312, 314 of the first leg 302, and a central portion 320, that substantially correspond to like components shown in FIG. 3. For ease of description, and unless otherwise specified, reference shall be made to the partial cross-sectional view of the spring 204 shown in FIG. 6 for the duration of this disclosure. It is understood, however, that any of the configurations, relationships, and/or other characteristics of the springs 204 described below are applicable to any of the additional springs 204 described herein.

In example embodiments, a keyboard 108 of the present disclosure may further include at least one layer of riser film 602. The riser film 602 may be made from any plastic, polymers, laminate, adhesive, and/or other like material. In some embodiments, the riser film 602 may be formed from one or more of the materials described above with respect to either the substrate 206 or the sheet of material 202. The riser film 602 may be disposed, for example, at least partially between the substrate 206 and a portion of the sheet of material 202. For example, the riser film 602 may be disposed between the substrate 206 and one or more substantially planar portions of the sheet of material 202 surrounding the springs 204.

For example, the riser material 602 may be disposed substantially parallel to the substrate 206. In such embodiments, the riser film 602 may extend toward a central axis 604 of each spring 204, in the direction of the X-axis shown in FIG. 6, but may stop proximate, for example, the first ends of the respective legs 302, 306 of the spring 204. Such a central axis 604 may extend substantially perpendicular to the peak 310 and may pass centrally through the peak 310 in the direction of the Z-axis. Thus, as shown in FIG. 6, substantially no riser film 602 may be disposed between the substrate 206 and the peak 310. Likewise, substantially no riser film 602 may be disposed between the substrate 206 and the respective legs 302, 306 of the spring 204. In this way, the riser film 602 may assist in increasing the range of travel of the peak 310. Such an example range of travel is illustrated by arrow 606. In some embodiments, it may be desirable to maximize the range of travel of the peak 310 while minimizing, for example, the height H1 of the spring 204.

In some embodiments, the range of travel of the peak 310 may be the distance between an initial position 608 of the peak 310 and a final position 610 (shown in phantom) of the peak 310, and such a range of travel may be less than approximately 2 mm. For example, in some embodiments a desired range of travel may be less than or approximately equal to 1 mm. Alternatively, in further embodiments the range of travel may be greater than approximately 2 mm.

However, even with such a relatively short range of travel, springs 204 of the present disclosure may be configured to provide a maximum resistive force that is between at least about 40 grams-force (about 0.088 pounds-force). In some embodiments, the maximum resistive force may be about 60 grams-force (about 0.132 pounds-force) or more, and in further embodiments, the maximum resistive force may be greater than about 100 grams-force (about 0.220 pounds-force). For example, such maximum resistive force may be different from key to key, and a greater maximum resistive force may be used for keys 118, such as the "enter" key or the "space bar", that are more frequently used. As a result, springs 204 of the present disclosure having respective peaks 310 characterized by a range of travel that is approximately 1 mm or less may have the tactile feel of a conventional mechanical spring characterized by a range of travel that is greater than or equal to approximately 2 mm. In such embodiments, the peak 310 may be spaced from the substrate 206 by a distance less than approximately 2 mm. As shown in at least FIG. 6, the substantially planar peak 310 may have any width dimension X useful for tuning the spring 204. In example embodiments of the present disclosure, the width X of a peak 310 may be between at least about 0.1 mm and at most about 2 mm or greater. For example, in some embodiments such a width X may be any dimension between about 0.5 mm and about 1.6 mm.

Further, the initial position 608 described above may be a position of the peak 310 without external forces, such as a key stroke force, being applied to the spring 204. The final position 610, on the other hand, may be a position of the peak 310 with an external force being applied to the spring 204 such that the spring 204 abuts the substrate 206. For example, when the peak 310 is in the final position 610, a bottom surface 612 of the peak 310 may be in contact with the substrate 206. Such a final position 610 may be achieved when, for example, a key 118 of the keyboard 108 including the spring 204 is fully depressed by the user. Thus, the range of travel of the peak 310 may extend from the initial position 608 to the final position 610. Additionally, it is understood that such a range of travel may extend in a direction substantially perpendicular to the peak 310, such as in the direction of the central axis 604.

In example embodiments, the riser film 602 may have any length, width, height, and/or other dimension useful in tuning the range of travel of the peak 310. For example, the riser film 602 may have a height H2 that is between at least about 0.2 mm and at most about 0.6 mm. Alternatively, in further embodiments the riser film 602 may have a height H2 that is less than approximately 0.2 mm or that is greater than approximately 0.6 mm. It is understood that such configurations of the riser film 602 may assist in spacing the peak 310 from the substrate 206 so as to achieve a desired range of travel of the peak 310. In such embodiments, inclusion of the riser film 602 beneath the spring 204 may result in a combined height H3 that is less than or equal to approximately 2 mm. For example, in some embodiments such a spring/riser film combined height H3 may be less than or equal to approximately 1 mm. In other embodiments, however, the height H3 may be greater than approximately 1 mm.

Alternatively, in still further embodiments the substrate 206 may include one or more grooves, channels, cutouts, notches, or other like structures (not shown). In such embodiments, at least a portion of the sheet of material 202 may be at least partially disposed within, for example, a groove of the substrate 206. It is understood that in such embodiments, the riser film 602 may be omitted.

Figure 7:
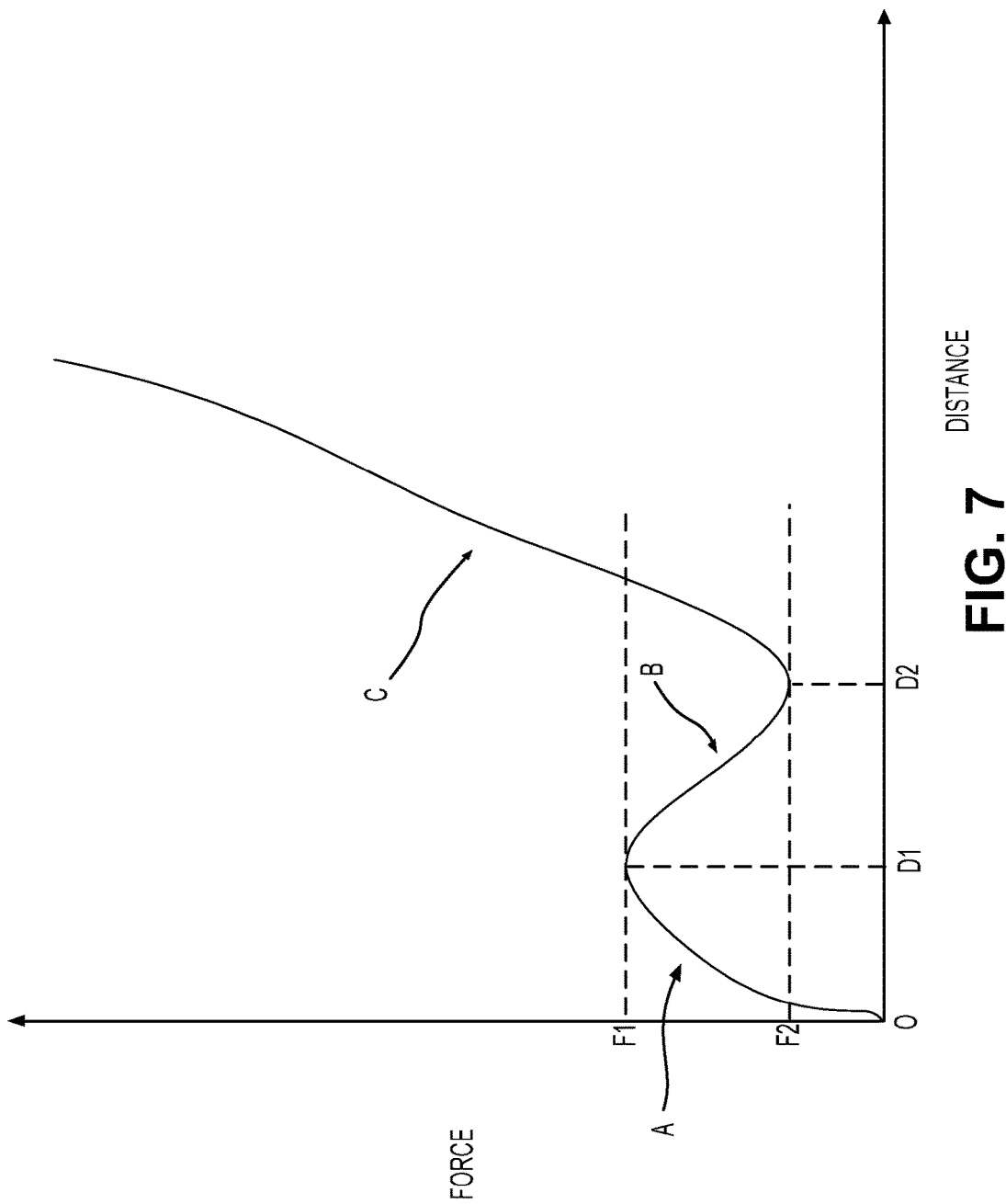
FIG. 7 is a plot illustrating an example relationship between force and distance.

FIG. 7 illustrates a force curve demonstrating the relationship between the resistive force (i.e., spring force) provided by the spring 204 and the distance traveled by the peak 310 from the initial position 608 to the final position 610 described above. As noted above, the resistive force provided by the spring 204 may vary as the peak 310 is moved through a corresponding range of travel. In particular, as a user applies a key stroke force to the spring 204 via a corresponding key 118, at a location proximate the peak 310, the peak 310 may move from the initial position 608 substantially in the direction of arrow 210. At this initial stage of movement, the resistive force provided by the spring 204 may increase until a maximum resistive force F1 is reached. As shown by section A of FIG. 7, such a maximum resistive force F1 may be provided by the spring 204 when the peak 310 has traveled a first distance D1 from the initial position 608. In example embodiments, the spring 204 may provide such a maximum resistive force F1 when the peak 310 is located at the first distance D1 from the initial position 608, and in some embodiments the first distance D1 may be between at least about 0.2 mm and at most about 0.4 mm. In further embodiments, such a first distance D1 may be less than approximately 0.3 mm, and the spring 204 may be tuned such that the maximum resistive force F1 may be between at least about 40 grams-force (about 0.088 pounds-force) and at most about 60 grams-force (about 0.132 pounds-force). Indeed, the spring 204 may be tuned such that the distance D1 is minimized. For example, the first distance D1 may be a distance less than or equal to approximately ⅕ of the range of travel of the peak 310.

In example embodiments, the resistive force provided by the spring 204 may decrease after the peak 301 travels greater than the first distance D1 from the initial position 608. In particular, the spring 204 may be tuned such that the resistive force provided by the spring 204 decreases once the peak 310 travels a distance from the initial position 608 that is greater than approximately ⅕ of the range of travel of the peak 310. Such a decrease in the resistive force is shown by section B of FIG. 7. At this intermediate stage of movement, the resistive force provided by the spring 204 may decrease until a minimum resistive force F2 is reached at a distance D2 from the initial position 608. In example embodiments, the spring 204 may be tuned such that the distance D2 is maximized, and/or such that the distance between distances D1 and D2 is maximized. For example, maximizing the range of travel of the peak 310 during which the resistive force provided by the spring 204 decreases may maximize the ergonomics, tactile feel, and/or usability of the keyboard 108. Tuning the spring 204 in this way may also result in a user experience that closely approximates that of a conventional keyboard. In example embodiments, the distance between D1 and D2 may comprise greater than approximately 50% of the total travel distance of the spring 204, and in some embodiments, the distance between D1 and D2 may comprise greater than approximately 60% of the total travel distance of the spring 204. For comparison purposes, the distance between analogous portions of known dome spring force curves typically comprises between approximately 30% and approximately 35%. As a result, an example spring 204 having a total travel distance of approximately 1 mm may provide a tactile response similar to that of a dome spring having a total travel distance of approximately 2 mm.

In some embodiments, once the peak 310 has traveled a distance D2 from the initial position 608, the bottom surface 612 of the peak 310 may be substantially in contact with the substrate 206. As a result, the resistive force provided by the spring 204 may sharply rise as key stroke force is applied to the spring 204 by the user via the key 118. Such an example increase in the resistive force is illustrated by section C of FIG. 7. In example embodiments, in section C the spring 204 may travel a distance that is approximately equal to the distance D1 described above with respect to section A. For example, in section C, the spring 204 may be configured to travel less than approximately 0.3 mm. In some embodiments, the spring 204 may be tuned such that the distance traveled in section C is minimized. For example, as noted above with respect to the distance D1, the distance traveled in section C may be less than or equal to approximately ⅕ of the range of travel of the peak 310.

Example Process

Figure 8:
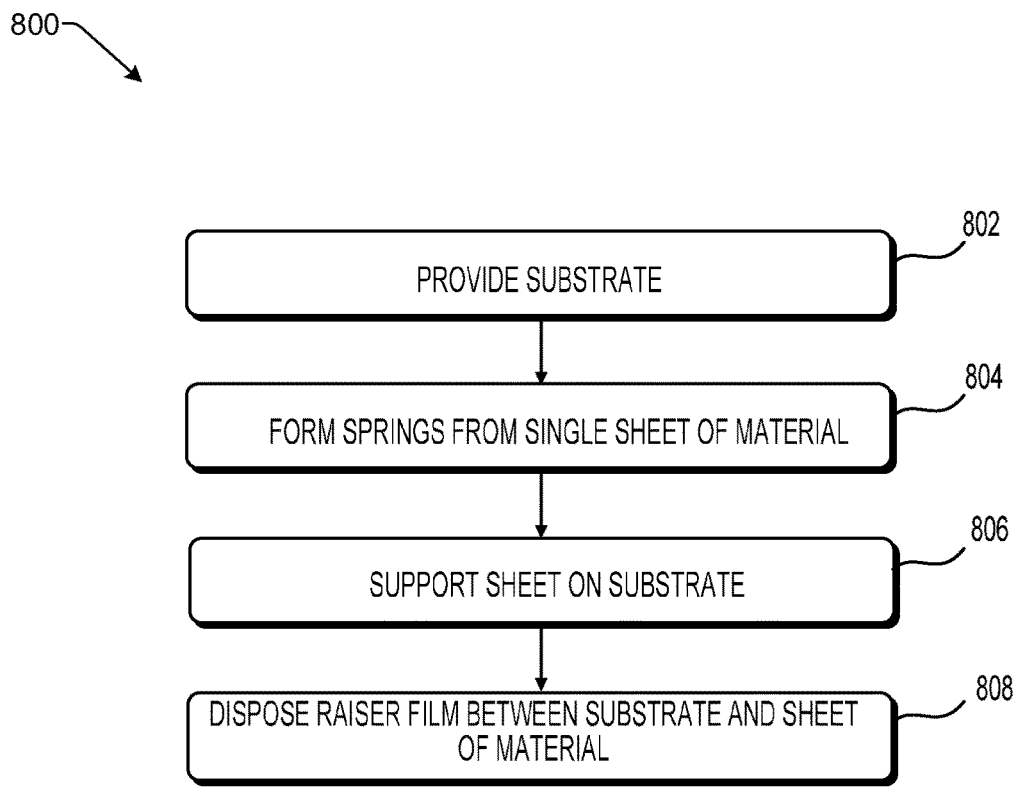
FIG. 8 is a flow diagram illustrating an example method of manufacturing a touch-sensitive input device.

FIG. 8 illustrates a process 800 as a collection of blocks in a logical flow diagram. The process 800 represents a sequence of operations that can be implemented in hardware, software, or a combination thereof. In the context of software, the blocks shown in FIG. 8 represent computer-executable instructions that, when executed by one or more processors, such as the processor 104, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. For discussion purposes, the process 800 is described with reference to the architecture 100 of FIG. 1, and the keyboard 108, keys 118, sheet of material 202, springs 204, substrate 206, and other components of FIGS. 1-3 and 6. Nevertheless, it is understood that the process 800 shown in FIG. 8 is equally applicable to the embodiments shown in FIGS. 4 and 5.

As shown in FIG. 8, an example method of manufacturing a touch-sensitive input device, such as the keyboard 108, may include providing a substantially planar substrate 206. Such a substrate 206 may be provided at 802. The process 800 may also include forming a plurality of springs 204 from a single sheet of material 202 at 804. As noted above, each spring 204 of the plurality of springs may be included on the same sheet of material 202. Moreover, such springs 204 may be formed on the sheet of material 202 via any molding, cutting, etching, thermoforming, and/or other like process. Such processes may also include rolling, pressing, stretching, flattening, and/or otherwise preparing the sheet of material 202 to have a desired length, width, height, thickness, and/or other configuration.

As noted above, example springs 204 of the present disclosure may have any of a variety of different configurations. For example, at least one spring 204 of the plurality of springs formed at 804 may include a substantially planar peak 310 that is spaced from the substrate 206. As described above with respect to FIG. 6, in some embodiments the peak 310 may be spaced from the substrate 206 by either the height H1 of the spring 204 or, in some embodiments, by the combined height H3. Additionally, such a spring 204 may include a first substantially arcuate leg 302 extending from the peak 310 toward the substrate 206. In such embodiments, the first leg 302 may be oriented in a first direction 322 (FIG. 3) relative to the peak 310. Additionally, such a spring 204 may include a second substantially arcuate leg 304 extending from the peak 310 toward the substrate 206. Such a second leg 304 may be oriented in a second direction 324 (FIG. 3) relative to the peak 310 that is substantially perpendicular to the first direction 322 described above.

Moreover, the springs 204 formed as part of the process 800 may be configured to provide a resistive force in response to the application of a key stroke force by a user of the keyboard 108. For example, the resistive force provided by the spring 204 may increase as the peak 310 begins traveling from an initial position 608, and may continue to increase until the spring 204 provides a maximum resistive force F1 at a first distance D1 from the initial position 608. In example embodiments, such a first distance D1 may be less than or equal to approximately ⅕ of the range of travel of the peak 310. Additionally, the resistive force provided by the spring 204 may decrease after the peak 310 travels the first distance D1 from the initial position 608 of the peak 310. The above relationships are described above in further detail with regard to the plot shown in FIG. 7.

In further embodiments, forming one or more springs 204 from the sheet of material 202 at 804 may also include forming a third substantially arcuate leg 306 extending from the peak 310 of the spring 204 in a third direction 326 (FIG. 3) substantially perpendicular to the second direction 324. Forming one or more springs 204 may also include forming a fourth substantially arcuate leg 308 extending from the peak 310 of the spring 204 in a fourth direction 328 substantially perpendicular to the first and third directions 322, 326. In still further embodiments, as described above with respect to FIG. 5 the first and second legs 302, 304 may comprise a first pair of legs disposed at a first corner 518 of the peak 310. In such embodiments, forming the plurality of springs 204 at 804 may include forming a second pair of legs 506, 508 disposed at a second corner 520 of the peak 310, forming a third pair of legs 510, 512 at a third corner 522 of the peak 310, and forming a fourth pair of legs 514, 516 at a fourth corner 524 of the peak 310.

The process 800 may further include supporting the sheet of material 202 on the substrate 206 at 806. In some embodiments, such a process may also include forming at least one groove in the substrate 206 and disposing at least a portion of the sheet of material 202 within the at least one groove. Alternatively, at 808 a layer of raiser film 602 may be disposed between the substrate 206 and the sheet of material 202. As shown in at least FIG. 6, such a layer of raiser film 602 may assist in maximizing the range of travel of the peak 310 once the sheet of material 202 has been disposed thereon.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system, comprising:
   a processor;
   a computer-readable media operably connected to the processor; and
   a touch-sensitive input device operably connected to at least one of the processor or the computer-readable media, the touch-sensitive input device including a plurality of keys, wherein each key of the plurality of keys includes at least one spring comprising:
   a substantially planar peak located at a central portion of the at least one spring,
   a first substantially arcuate leg extending from the peak in a first direction, and
   a second substantially arcuate leg, separate from the first leg, extending from the peak in a second direction, wherein
   a resistive force provided by the at least one spring decreases after the peak travels a first distance from an initial position of the peak, and wherein the first distance is less than or equal to ⅕ of a range of travel of the peak,
   the range of travel of the peak extends from the initial position to a final position,
   the range of travel extends in a direction substantially perpendicular to the peak,
   the at least one spring has a height, extending in the direction substantially perpendicular to the peak, from a top surface of the peak to a bottom surface of the first leg,
   the range of travel is greater than the height, and
   the at least one spring is configured to provide the resistive force in response to application of a key stroke force proximate the peak.

2. The system of claim 1, wherein the range of travel of the peak is less than approximately 2 mm.

3. The system of claim 1, wherein the first distance is less than approximately 0.3 mm, and the at least one spring comprises a polymeric spring.

4. The system of claim 1, wherein the resistive force provided by the at least one spring increases as the peak travels, from the initial position, a distance less than or substantially equal to the first distance.

5. The system of claim 1, wherein the touch-sensitive input device includes a sensor in communication with each key and the processor, the sensor being configured to determine a position of the peak along the range of travel.

6. The system of claim 1, wherein the at least one spring is configured to provide a corrective torque in response to application of the key stroke force to an off-center location on the at least one spring, wherein the off-center location is disposed between the peak and an end of at least one of the first and second legs.

7. The system of claim 1, wherein the at least one spring further comprises a third substantially arcuate leg extending from the peak in a third direction substantially perpendicular to the second direction, and a fourth substantially arcuate leg extending from the peak in a fourth direction substantially perpendicular to the first and third directions.

8. The system of claim 1, wherein the touch-sensitive input device comprises a plurality of springs, the plurality of springs being formed from a single sheet of material having a thickness of approximately 0.1 mm.

9. The system of claim 1, wherein the at least one spring provides a maximum resistive force when the peak is located at a distance between at least about 0.2 mm and at most about 0.4 mm from the initial position, and wherein the maximum resistive force is between at least about 40 grams-force and at most about 60 grams-force.

10. The system of claim 1, wherein the first and second legs comprise a first pair of legs disposed at a first corner of the peak, each key of the plurality of keys further comprising a second pair of legs disposed at a second corner of the peak, a third pair of legs disposed at a third corner of the peak, and a fourth pair of legs disposed at a fourth corner of the peak.

11. The system of claim 1, wherein at least one key of the plurality of keys includes a keycap having at least four edges, the first and second legs comprising a first pair of legs disposed along an edge of the at least four edges,
   the first leg having a first end disposed opposite the peak, and the second leg having a second end disposed opposite the peak and separate from the first end.

12. The system of claim 1, wherein the central portion has a substantially planar bottom surface, the bottom surface of the central portion extending substantially parallel to the first and second directions, and extending from the first leg to the second leg.

13. A touch-sensitive input device, comprising:
   a substantially planar substrate; and
   a plurality of springs supported on the substrate, wherein at least one spring of the plurality of springs comprises:
   a peak spaced from the substrate,
   a central longitudinal axis extending substantially perpendicular to the substrate,
   a first substantially arcuate leg integral with and extending from the peak toward the substrate, the first leg being oriented in a first direction relative to the peak, and
   a second substantially arcuate leg integral with and extending from the peak toward the substrate, the second leg being separate from the first leg and oriented in a second direction relative to the peak substantially perpendicular to the first direction, wherein
   the peak includes a substantially planar bottom surface facing the substrate,
   the substantially planar bottom surface extending substantially parallel to the substrate from the first leg to the second leg, and
   the central longitudinal axis passing through the substantially planar bottom surface, and
   a resistive force provided by the at least one spring increases as the peak travels a first distance, toward the substrate, from an initial position of the peak, the resistive force increasing until a maximum resistive force is provided by the at least one spring, and the resistive force decreasing after the peak travels the first distance,
   wherein the at least one spring has a height, extending along the central longitudinal axis, from a top surface of the peak to a bottom surface of the first leg, and
   a range of travel of the at least one spring, along the central longitudinal axis, is greater than the height.

14. The touch-sensitive input device of claim 13, wherein the substrate comprises a printed circuit board, and wherein the plurality of springs is formed from a single sheet of polymeric material, the single sheet of material being supported on the substrate, and the first distance being less than approximately 0.3 mm.

15. The touch-sensitive input device of claim 14, the sheet of material having a substantially constant thickness such that a thickness of the first leg is equal to a thickness of the peak.

16. The touch-sensitive input device of claim 13, wherein the first distance is less than or equal to ⅕ of a range of travel of the peak.

17. The touch-sensitive input device of claim 13, wherein the at least one spring provides the maximum resistive force when the peak is located at a distance between at least about 1 mm and at most about 3 mm from the initial position, and wherein the maximum resistive force is between at least about 40 grams-force and at most about 60 grams-force.

18. A method of manufacturing a touch-sensitive input device, comprising:
- providing a substantially planar substrate;
- forming a plurality of springs from a single sheet of material;
- a central longitudinal axis extending substantially perpendicular to the substrate, and
- supporting the sheet of material on the substrate, wherein at least one spring of the plurality of springs comprises:
- a substantially planar peak spaced from the substrate,
- a first substantially arcuate leg extending from the peak toward the substrate, the first leg being oriented in a first direction relative to the peak, and
- a second substantially arcuate leg extending from the peak toward the substrate, the second leg being separate from the first leg and oriented in a second direction relative to the peak substantially perpendicular to the first direction, wherein
- a resistive force provided by the at least one spring decreases after the peak travels a first distance, toward the substrate, from an initial position of the peak, the first distance being less than or equal to ⅕ of a range of travel of the peak,
- wherein the at least one spring has a height, extending along the central longitudinal axis, from a top surface of the peak to a bottom surface of the first leg, and
- the range of travel of the at least one spring, along the central longitudinal axis, is greater than the height.

19. The method of claim 18, further comprising forming at least one groove in the substrate and disposing at least a portion of the sheet of material within the at least one groove.

20. The method of claim 18, further comprising disposing a layer of raiser film between the substrate and the sheet of material.

21. The method of claim 18, wherein forming the plurality of springs comprises:
- forming a third substantially arcuate leg extending from the peak of the at least one spring in a third direction substantially perpendicular to the second direction, and
- forming a fourth substantially arcuate leg extending from the peak of the at least one spring in a fourth direction substantially perpendicular to the first and third directions.

22. The method of claim 18, wherein the first and second legs comprise a first pair of legs disposed at a first corner of the peak, and
wherein forming the plurality of springs further comprises:
- forming a second pair of legs disposed at a second corner of the peak,
- forming a third pair of legs disposed at a third corner of the peak, and
- forming a fourth pair of legs disposed at a fourth corner of the peak.

23. The method of claim 18, wherein the range of travel of the peak is less than approximately 2 mm.

24. The method of claim 18, wherein the at least one spring provides a maximum resistive force when the peak is located at a distance between at least about 0.2 mm and at most about 0.4 mm from the initial position, and wherein the maximum resistive force is between at least about 40 grams-force and at most about 60 grams-force.

* * * * *